United States Patent
Favero et al.

(10) Patent No.: US 10,858,566 B2
(45) Date of Patent: Dec. 8, 2020

(54) DRILLING FLUID WITH IMPROVED FLUID LOSS AND VISCOSIFYING PROPERTIES

(71) Applicant: S.P.C.M. SA, Andrezieux Bouthéon (FR)

(72) Inventors: Cédrick Favero, Andrezieux Bouthéon (FR); Bruno Giovanneti, Andrezieux Bouthéon (FR); Olivier Ratel, Andrezieux Bouthéon (FR); Pierrick Cheucle, Andrezieux Bouthéon (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 16/848,338

(22) Filed: Apr. 14, 2020

(65) Prior Publication Data

US 2020/0255716 A1  Aug. 13, 2020

(51) Int. Cl.
  *C09K 8/12* (2006.01)
  *C08F 2/58* (2006.01)
  *C08F 220/58* (2006.01)

(52) U.S. Cl.
  CPC ............ *C09K 8/12* (2013.01); *C08F 220/585* (2020.02)

(58) Field of Classification Search
  None
  See application file for complete search history.

(56) References Cited

U.S. PATENT DOCUMENTS

| | | |
|---|---|---|
| 4,257,903 A | 3/1981 | Kucera et al. |
| 4,293,427 A | 10/1981 | Lucas et al. |
| 4,357,245 A | 11/1982 | Engelhardt et al. |
| 4,395,524 A | 7/1983 | Emmons et al. |
| 4,404,111 A | 9/1983 | Bi et al. |
| 4,471,097 A | 9/1984 | Uhl et al. |
| 4,502,964 A | 3/1985 | Giddings et al. |
| 4,520,182 A | 5/1985 | Turner et al. |
| 4,521,580 A | 6/1985 | Turner et al. |
| 4,547,299 A | 10/1985 | Lucas |
| 5,134,118 A | 7/1992 | Patel et al. |
| 2013/0105165 A1* | 5/2013 | Reichenbach-Klinke ............ C08F 230/02 166/305.1 |
| 2020/0048535 A1* | 2/2020 | Favero ............ C09K 8/588 |
| 2020/0223959 A1* | 7/2020 | Rodrigues ............ C08F 16/30 |

* cited by examiner

*Primary Examiner* — Jeffrey D Washville
(74) *Attorney, Agent, or Firm* — Heslin Rothenberg Farley & Mesiti P.C.

(57) ABSTRACT

The invention relates to a water-soluble branched sulfonated amphoteric polymer, for a water-based drilling fluid, wherein the polymer is obtained by precipitation polymerization, in a mixture of polar solvents, of at least one N,N'-dialkylacrylamide monomer and one sulfonic acid-containing monomer, in the presence of tetraallylammonium halide as branching agent.

The invention also relates to a water-based drilling fluid for subterranean boreholes, including:
  an aqueous fluid, said aqueous fluid being selected from sea water, brine, or salt-containing aqueous solution,
  between 0.1 and 5.0 weight percent of the water-soluble branched sulfonated amphoteric polymer described above.

15 Claims, 1 Drawing Sheet

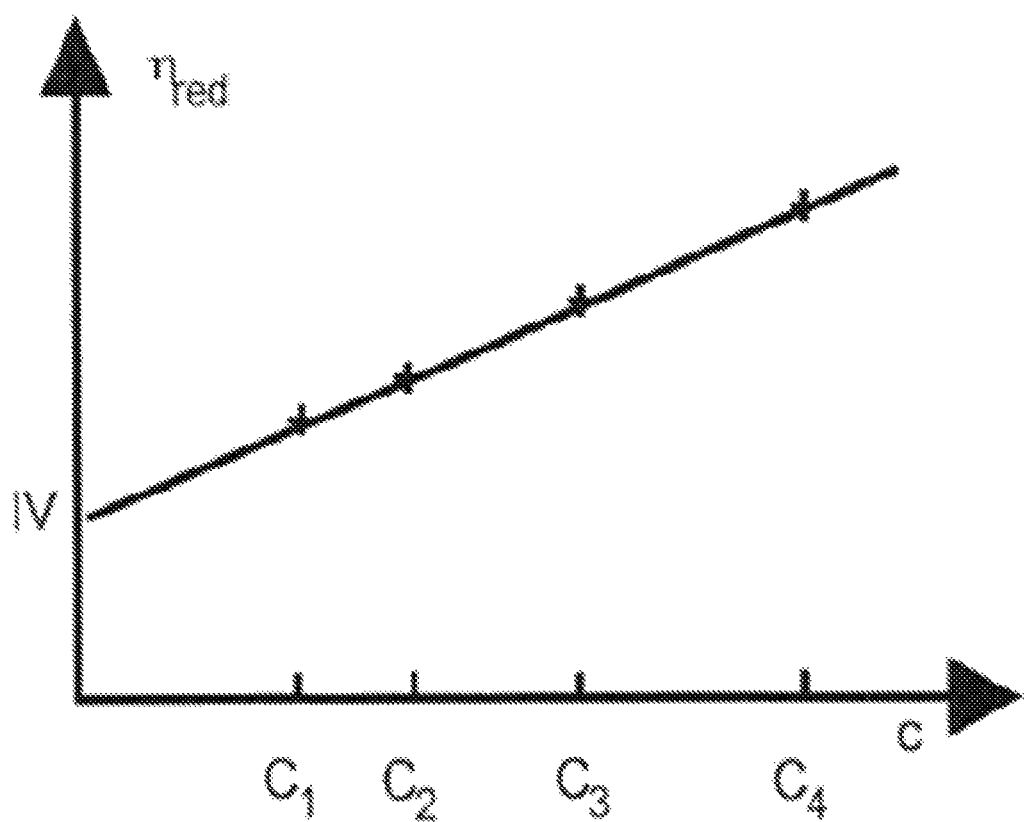

DRILLING FLUID WITH IMPROVED FLUID LOSS AND VISCOSIFYING PROPERTIES

FIELD OF THE INVENTION

The present invention relates to an improved additive for use in water-based drilling fluids that have utility in the drilling of subterranean boreholes. Thus, the improved drilling fluid of this invention exhibits improved thermal stability and other enhanced properties.

BACKGROUND

During a well drilling operation, drilling fluids are circulated down the wellbore being drilled. The drilling fluid is generally pumped down the inside of the drill pipe and then passes through the drill bit into the wellbore. The fluid returns to the surface through the annulus, where it can then be recovered, processed, and reused. Drilling fluids perform a number of important duties during a drilling operation, such as lubricating and cooling the drill bit and removing generated rock cuttings. Maintaining sufficiently high viscosities of drilling fluids to provide effective suspension and removal of cuttings, and to provide effective fluid loss control, can be challenging, especially under high temperature conditions that can be experienced downhole.

One common way to attain high viscosities in drilling is to use a mixture of water and a viscosifier (thickener), such as xanthan gum or polyacrylamides. The higher temperatures experienced downhole, the presence of certain ions in water (such as sea water) may limit, reduce, or degrade the effectiveness of certain viscosifiers, resulting in the use of larger amounts of viscosifier to compensate for the high temperatures, or the use of expensive temperature-resistant viscosifiers.

During the drilling of an oil well using rotary drilling techniques, filtrate from the drilling fluid may be forced into the adjacent subterranean formation. In the case of aqueous based drilling fluids (sometimes referred to as "drilling mud") the filtrate is essentially water, which may have certain undesirable effects on the formation. Materials have been used in the past to control filtration rates of aqueous drilling fluids by plugging the pores in the formation by making filter cakes. Materials used for sealing the filter cake pores include materials such as starches, modified starches, cellulose, modified cellulose, and synthetic polymers, such as polyacrylates, polyacrylamides, and lignites. However, these types of materials have certain well-known shortcomings. For example, starches and cellulose materials are not stable at high temperatures. Polyacrylates and polyacrylamides have limitations concerning high salts and divalent cation contaminations.

Filtration control additives are thus needed which would quickly form a thin, dispersible filter cake, and which would also have high temperature stability for prolonged periods of time.

Various attempts have been made in the past to achieve this purpose. For example, U.S. Pat. No. 4,471,097 to Uhl et al. teaches the use of water-soluble sulfonated polymers containing vinylimidazole for filtration control in high temperature and high calcium water based mud. The cross-linking of these polymers is optional. U.S. Pat. No. 4,293,427 to Lucas et al. teaches the use of acrylamide/2-acrylamido-2-methylpropane sulfonic acid (AMPS) copolymer as a filtration control agent in aqueous based drilling fluid. The cross-linking of the copolymer is optionally carried out by use of cationic salts. Ionic cross-linking is very labile and pH dependent. Turner et al., in U.S. Pat. Nos. 4,520,182 and 4,521,580, teach the manufacturing of water-soluble copolymers such as acrylamide/alkyl acrylamide as viscosifiers for water or brine systems. Griddings et al. in U.S. Pat. No. 4,502,964 teach the use of a terpolymer of AMPS, N,N-dimethyl acrylamide and acrylonitrile as a high temperature fluid loss additive and rheology stabilizer for high temperature oil wells.

U.S. Pat. No. 5,134,118 discloses the use of a water soluble polymer of AMPS and N,N-dimethylacrylamide in water based drilling fluids to increase the viscosity at low shear rates and improved fluid loss control. N,N-dimethylacrylamide/AMPS copolymers for petroleum recovery are disclosed in U.S. Pat. No. 4,404,111 by Bi et al. The use of water soluble copolymers of N,N-dimethylacrylamide and AMPS as fluid loss control agents is described in U.S. Pat. No. 4,547,299 to Lucas et al. The cross-linking is optional. Englehardt et al. in U.S. Pat. No. 4,357,245 describe terpolymers of AMPS, N-vinylacetamide, and optionally acrylamide as drilling fluid additives for water based drilling fluid. U.S. Pat. No. 4,257,903 to Kucera et al. teaches drilling fluids containing cross-linked polysaccharide derivatives. Emmons et al. in U.S. Pat. No. 4,395,524 teach non-ionic and anionic water soluble polymers of acrylamide and N,N-dimethylacrylamide as thickening agents or rheology modifiers for water-based systems.

Technical Problem Solving

Thus, there has been a well-defined need for a drilling fluid containing an additive that is thermally stable at temperatures in excess of 200 DEG F. (93° C.), stable to high shear, high pressure and that is substantially unaffected by salts or solids contamination. The additive is a specific cross-linked amphoteric polymer.

This invention relates a polymeric additive for water-based drilling fluid, which shows excellent fluid loss control and viscosifying properties under high temperature, high pressure and high salinity operating conditions. The polymeric additive is a water-soluble branched sulfonated amphoteric polymer obtained prepared by precipitation polymerization in a polar solvent mixture, from at least an N,N'-dialkyl(meth)acrylamide monomer, an anionic sulfonated vinylic monomer and at least tetraallylammonium halide as branching agent.

Another aspect of the invention is a drilling fluid for subterranean boreholes including this water-soluble branched sulfonated amphoteric polymer and a salt containing water solution. Under high temperature conditions (temperature between 200 and 400° F.-93° C.-204° C.) in this drilling fluid, the branched sulfonated amphoteric polymer has a Huggins $K_H$ coefficient, nearly constant up to 7 days (less than 10% of variation).

Description of the Invention

A first aspect of the invention is a water-soluble branched sulfonated amphoteric polymer for water-based drilling fluid, comprising at least an N,N'-dialkylacrylamide monomer, and a sulfonic acid-containing monomer, wherein the polymer is branched with tetrallylammonium halide as branching agent, and wherein the polymer is obtained by precipitation polymerization in a mixture of polar solvents (at least two polar solvents).

The branched sulfonated amphoteric polymer is water-soluble. This means that, after a filtration step of a diluted polymer solution, there is no visible polymer particle or gel on the sieve, and a centrifugation step does not put in evidence a white and/or hazy precipitated phase at the bottom of the centrifugated tube.

For the filtration and centrifugation steps, a highly diluted aqueous solution of polymer is prepared and kept under agitation for 4 hours (the concentration for this test is typically 500 ppm (parts per million by weight) of polymer in de-ionized water). One part of the polymer solution is centrifugated at high speed (around 13500 rpm—rounds per minute) for at least 30 minutes. After the centrifugation, the aspect of the solution is checked. Other part of the polymer solution is filtrated by gravity (sieve mesh size: 200 μm (200 micrometers)).

Preferably, the water-soluble branched sulfonated amphoteric sulfonated polymer comprises between 0.1 and 5.0 weight percent of tetraallylammonium halide based on the total weight of the monomers of said polymer, that is, polymerized monomers that constitute the polymer, more preferentially between 0.2 and 4.0 weight percent and even more preferentially between 0.4 and 2 weight percent.

Preferably, the tetraallylammonium halide is the tetraallylammonium chloride (TAAC).

The sulfonic acid-containing monomer is advantageously selected from the group consisting of vinyl sulfonic acids, preferably 2-acrylamido-2-methylpropane-sulfonic acid, 2-methacrylamido-2-methylpropane-sulfonic acid, sulfonated styrene, allyl ether sulfonic acids, and their corresponding salts. Salts are preferably alkaline salts, alkaline earth salts or ammonium salt.

Preferred sulfonic acid-containing monomer is the 2-acrylamido-2-methylpropane-sulfonic acid, and preferred salts are ammonium and sodium salts of said 2-acrylamido-2-methylpropane-sulfonic acid. The most preferred salt is the sodium salt of said 2-acrylamido-2-methylpropane-sulfonic acid.

In a preferred embodiment, the water-soluble branched sulfonated amphoteric polymer contains between 50 and 99.9 mole percent of sulfonic acid-containing monomer based on the total number of moles of monomers of said polymer.

The preferred sulfonic acid-containing monomer is the sodium 2-acrylamido-2-methylpropane-sulfonate.

The N,N'-dialkyl(meth)acrylamide is preferably selected from the group where alkyl groups are $C_1$ (1 carbon atom) to $C_{14}$ (14 carbon atoms). Preferred N,N'-dialkyl(meth)acrylamides are N,N'-dimethylacrylamide or acryloyl morpholine. The alkyl group can be linear or cyclic branched, preferably linear or cyclic.

The water-soluble branched sulfonated amphoteric polymer of the invention can also contain one or more anionic monomers other than the sulfonic acid-containing monomer, such as for example acrylic acid, methacrylic acid, itaconic acid, maleic acid, fumaric acid, vinylphosphonic acid and their corresponding salts.

The water-soluble branched sulfonated amphoteric polymer of the invention can also contain one or more nonionic monomers other than N,N'-dialkyl(meth)acrylamide, such as for example acrylamide, methacrylamide, N-mono derivatives of acrylamide, N-mono derivatives of methacrylamide, acrylic esters and methacrylic esters, N-vinylformamide, N-vinyl acetamide, N-vinylpyridine and N-vinylpyrrolidone.

The water-soluble branched sulfonated amphoteric polymer of the invention can also contain at least one cationic monomer, preferably selected from the group comprising quaternized or salified dimethylaminoethyl acrylate (DMAEA), quaternized or salified dimethylaminoethyl methacrylate (DMAEMA), diallyldimethyl ammonium chloride (DADMAC), acrylamidopropyltrimethylammonium chloride (APTAC), methacrylamidopropyltrimethylammonium chloride (MAPTAC). The chloride anion may be substituted by any other anion, for instance any halide such as bromide.

Optionally, one or more additional branching agents can be used with tetraallyammonium halide. This additional branching agent may be chosen from the group comprising polyethylenically unsaturated monomers (having at least two unsaturated functional groups), for example the vinyl, allylic, acrylic and epoxy functional groups. Another preferred additional branching agent is methylene bisacrylamide (MBA).

The water-soluble branched sulfonated amphoteric polymer of the invention is obtained by precipitation polymerization in a mixture of polar solvents. In general, the polymerization is performed by free radicals using UV, azo, redox or thermal initiators as well as controlled radical polymerization techniques (CRP) or more particularly of RAFT type (Reversible Addition Fragmentation Chain Transfer).

Monomers and branching agent are dissolved or dispersed in a polar solvent mixture, and the polymerization is started. The polymerization is started by forming a radical from the branching agent or monomers.

According to an embodiment, the monomers are polymerized directly after their addition to the mixture.

According to another embodiment, the monomers are neutralized before polymerization, for example by replacing their acidic groups (sulfonic acid) with bases before polymerization. Alternatively, instead of neutralizing the monomers before polymerization, the polymers obtained after polymerization may be neutralized with the bases. The neutralization (prior to and/or during and/or after the polymerization) may be partial or total.

Advantageously, to produce the water-soluble branched sulfonated amphoteric polymer in a polar solvent mixture, sulfonic acid moieties are neutralized with a base containing a $Li^+$, $Na^+$, $K^+$, $Ca^{2+}$, $Mg^{2+}$, $Zn^{2+}$ or an ammonium, preferably with the corresponding hydroxides, hydrogen carbonates or carbonates, and more preferably with carbonates or hydrogen carbonates.

Preferred bases for neutralization are sodium hydrogen carbonate, sodium carbonate, sodium hydroxide, potassium hydrogen carbonate, potassium carbonate, potassium hydroxide, lithium hydrogen carbonate, lithium carbonate, lithium hydroxide, calcium hydrogen carbonate, calcium carbonate, calcium hydroxide, ammonium carbonate, ammonium hydrogen carbonate.

More preferably, bases for neutralization are chosen from sodium hydrogen carbonate, sodium carbonate, sodium hydroxide, potassium hydrogen carbonate, and potassium hydroxide.

The very preferred bases for neutralization are sodium hydrogen and sodium carbonate.

Preferably, to neutralize sulfonic acid moieties with an ammonium, a flow of gaseous ammonia in the solvent is used. The resulting sulfonic salt is a tertiary ammonium salt.

Polar solvents for precipitation polymerization are preferably selected from the group comprising: water, methanol, ethanol, 1-propanol, 2-propanol, 2-methyl-2 propanol, 1 butanol, 2-butanol, dimethyl ketone, diethyl ketone, pentan-2-one, butanone, tetrahydropyran, tetrahydrofuran, 2-methyltetrahydrofuran, 1,3-dioxane, 1,4-dioxane. The mixture of polar solvents is preferably a mixture of protic solvents.

In a preferred embodiment, for the production of the water-soluble branched sulfonated amphoteric polymer of the invention, radical precipitation polymerization occurs in a polar solvent mixture containing 2-methyl-2-propanol and water, preferably with a weight ratio 2-methyl-2-propanol/water comprised between 90/10 and 99/1.

Another aspect of the invention is a drilling fluid for subterranean boreholes comprising the water-soluble branched sulfonated amphoteric polymer above described and a salt containing aqueous solution.

In more details, the water-based drilling fluid for subterranean boreholes comprises:
an aqueous fluid, said aqueous fluid being selected from sea water, brine, or a salt containing aqueous solution, preferably between 0.1 and 5.0 weight percent of the water-soluble branched sulfonated amphoteric polymer above described.

In the present text, brine refers to a solution comprising water and an inorganic salt or an organic salt. The salt may serve to provide desired density to balance downhole formation pressures, and may also reduce the effect of the water-based fluid on hydratable clays and shales encountered during drilling.

In various embodiments of the drilling fluid disclosed herein, the brine may be selected from sea water, aqueous solutions wherein the salt concentration is less than that of sea water, or aqueous solutions wherein the salt concentration is greater than that of sea water. Salts that may be found in sea water include, but are not limited to, sodium, calcium, aluminum, magnesium, zinc, potassium, strontium, and lithium, salts of chlorides, bromides, carbonates, iodides, chlorates, bromates, formates, nitrates, oxides, phosphates, sulfates, silicates, and fluorides. Salts that may be incorporated in a brine include any one or more of those present in natural sea water and/or any other organic or inorganic dissolved salts.

In some embodiments, the salt may be a divalent halide, preferably selected from the group of alkaline earth halides or zinc halides.

The brine may also comprise an organic salt, such as sodium, potassium, or cesium formate. Inorganic divalent salts include calcium halides, such as calcium chloride or calcium bromide. Sodium bromide, potassium bromide, or cesium bromide may also be used.

The salt may be chosen for compatibility reasons. For example, the reservoir drilling fluid and the completion/clean up fluid may have identical or similar phases.

The drilling fluid of the invention may further comprise other additives and chemicals that are commonly used in oilfield applications by those skilled in the art. Such additives may include for example thinners, gelling agents, shale inhibitors, pH buffers . . . .

Other materials may be added to the drilling fluid to enhance the drilling fluid composition. Such other materials may include, for example: additives to reduce or control low temperature rheology or to provide thinning, additives for enhancing viscosity, additives for high temperature high pressure control, and additives such as emulsion stabilizers.

In a preferred embodiment, the water-soluble branched sulfonated amphoteric polymer of the water-based drilling fluid polymer preferably contains between 50 and 99.9 mole percent of sodium 2-acrylamido-2-methylpropane-sulfonate, between 0.1 and 50 mole percent of N,N-dimethylacrylamide, and between 0.1 and 2 weight percent of tetraallyl ammonium chloride (based on the total weight of the monomers).

According to another preferred embodiment, the water-soluble branched sulfonated amphoteric polymer of the water-based drilling fluid preferably contains between 50 and 99.9 mole percent of sodium 2-acrylamido-2-methyl-propane-sulfonate, between 0.1 and 50 mole percent of acryloyl morpholine, and between 0.1 and 2 weight percent of tetraallyl ammonium chloride (based on the total weight of the monomers).

When the drilling fluid is under high temperature conditions, for instance at a temperature superior or equal to 200° F., and typically between 200° F. and 400° F., its viscosity remains stable since the water-soluble branched sulfonated amphoteric polymer has a Huggins coefficient $K_H$ nearly constant up to 7 days (less than 10% of variation is observed at 200-400° F.).

The Huggins coefficient $K_H$ of the water-soluble branched sulfonated amphoteric polymer is derived from the Huggins equation (1) below:

$$\eta_{red} = [\eta] + K_H * [\eta]^2 * C \qquad (1)$$

wherein:
$\eta_{red}$ is the reduced viscosity of the polymer in solution—its dimension is the inverse of a concentration ($C^{-1}$ i.e. L/g or mL/g),
C is the mass concentration of the polymer in solution—usually in g/L or g/mL,
$[\eta]$ is the intrinsic viscosity of the solution—its dimension is the inverse of a concentration ($C^{-1}$ i.e. L/g or mL/g),
$K_H$ is the Huggins coefficient—no dimension.

The Huggins coefficient $K_H$ is a parameter indicating the morphology of the polymer in a given solvent, and at a given temperature and concentration. $K_H$ increases with the branching of the polymer.

FIGURE

FIG. 1 is a graph that represents the reduced viscosity $\eta_{red}$ of the polymer, as a function of the mass concentration C of said polymer.

The invention and the advantages thereof will become more apparent from the following examples and FIGURE.

EXAMPLES

Polymers

A list of the abbreviations used in the following examples is given below:
N,N-DMA: N,N-dimethylacrylamide,
ATBS.NH$_4$: Ammonium salt of 2-acrylamido-2-methyl-propanesulfonic acid,
ATBS.Na: Sodium salt of 2-acrylamido-2-methyl-propanesulfonic acid,
MBA: N,N-methylenebisacrylamide,
TAAC: tetraallylammonium chloride,
TAADMS: methyltriallylammonium sulfate.

Four water-soluble branched amphoteric sulfonated polymers, referred to polymers A to D, were synthesized by polymerization by precipitation, and a fifth water-soluble branched amphoteric sulfonated, referred to polymer E, was synthesized by inverse emulsion polymerization followed by a spray drying step.

The compositions of polymers A, B, C, D, and E are the following:
polymer A and polymer E: N,N-DMA/ATBS.NH$_4$/TAAC,
polymer B: N,N-DMA/ATBS.Na/TAAC,
polymer C: N,N-DMA/ATBS.NH$_4$/TAADMS,
polymer D: N,N-DMA/ATBS.NH$_4$/MBA.

Thermal stability of these polymers was evaluated in various brine solutions (CaCl$_2$, CaBr$_2$).

Polymer Synthesis

Polymer A (invention): This polymer is advantageously prepared using a 2 L jacketed stirred vessel equipped with a distillation column, pH and thermometer probe, a powerful stirrer, a nitrogen sparging nozzle and an ammonia gas inlet.

1570 g of pure tertio-butanol (2-methyl-2-propanol) and 65 g of water are initially introduced into a reactor. 106 g of acid ATBS are then added under stirring. The monomer is then fully neutralized thanks to a flow of gaseous ammonia that is passed into the suspension until pH reaches 8. The introduction of ammonia is then stopped and 6.1 g of N,N-dimethylacrylamide and 1.3 g of TAAC are subsequently added. The solution is then sparged with nitrogen for one hour while temperature is brought to 55° C.

When temperature is stabilized at 55° C., 1.6 g of dibenzoyl peroxide are added to the solution in order to initiate the reaction and to precipitate the formed amphoteric polymer. After the temperature stopped increasing, the solvent is evaporated under vacuum to directly get a dry powder of very low particle size of around 1 µm.

Polymer B (invention): The same procedure than that of polymer A is applied, except that sodium carbonate is used instead of $NH_3$ to reach the same requested pH.

Polymer C (comparative example): The same procedure than that of polymer A is applied, except that 1.8 g TAADMS is used instead of 1.3 g of TAAC.

Polymer D (comparative example): The same procedure than that of polymer A is applied, except that 1.1 g of methylene bis acrylamide is used instead of 1.3 g of TAAC.

Polymer E (comparative example): Polymer E has the same composition than polymer A. Polymer E is prepared according to a standard polymerization in water solution well known by the man skilled in the art, instead of a precipitation polymerization. The same monomers ratio and the same branching agent amount as those used in the preparation method of polymer A, are used to prepare polymer E. Polymer E in solution is then drum dried in order to get an amphoteric polymer in powder form with similar particle size than polymers A to D.

Polymer A and B correspond to water-soluble branched sulfonated amphoteric polymers according to the invention. Polymers C (branching agent TAAC), D (branching agent TAAC), and E (a single polar solvent, water) are not part of the invention and used as comparative examples.

Example 1

$K_H$ Variation

Thermal stability of polymers A to E was evaluated after 7 days at 300° F. All intrinsic viscosities and Huggins coefficient are presented in Table 1.

Polymers were solubilized in the $CaCl_2$ brine (composition described in Table 2). The viscous solution was fractioned and diluted to afford a wide range of concentrations. Each diluted solution of polymer, at different concentrations ($C_1$, $C_2$, $C_3$, and $C_4$ on the graph of FIG. 1), was injected through the capillary of an Ubbelohde viscosimeter (measure of pressure differential) using a very accurate piston pump to plot reduced viscosity relative to the concentration (measure of pressure differential). The extrapolation of reduced viscosity at concentration=0 g/L gives the intrinsic viscosity [η], noted IV on the y-axis of FIG. 1.

The Huggins coefficient $K_H$ was determined using the following equation (2):

$$K_H = \frac{slope}{[\eta]^2} \quad (2)$$

TABLE 1

$K_H$ coefficient measures

|  | Polymer | Polymerization | Branching Agent | UL (cP) | IV (mL/g) | $K_H$ |
|---|---|---|---|---|---|---|
| Before ageing | A | Precipitation | TAAC | 1.51 | 245 | 1.01 |
|  | B | Precipitation | TAAC | 1.51 | 240 | 1.05 |
|  | C | Precipitation | TAADMS | 1.51 | 235 | 0.95 |
|  | D | Precipitation | MBA | 1.56 | 240 | 0.94 |
|  | E | Solution | TAAC | 1.56 | 242 | 0.97 |
| After ageing | A | Precipitation | TAAC | 1.46 | 240 | 0.98 |
|  | B | Precipitation | TAAC | 1.41 | 235 | 1.00 |
|  | C | Precipitation | TAADMS | 1.21 | 210 | 0.85 |
|  | D | Precipitation | MBA | 1.16 | 205 | 0.8 |
|  | E | Solution | TAAC | 1.26 | 200 | 0.78 |

Results in Table 1 highlight that, for polymers A and B, the Huggins coefficient is stable after 7 days at 300° F. (less than 10% of variation).

Example 2

Test in $CaCl_2$ Brine Solution

In the following example, stability at high temperature and high salinity, and rheological properties of each polymer above described (A to E) were evaluated in wellbore fluids samples (see Table 2) formulated in a $CaCl_2$ brine presenting a density of 10.7 ppg (pounds per gallon), with a defoamer.

Wellbore fluid samples, noted F1, F2, F3, F4, and F5, were prepared by mixing CaCl2 and the defoamer in water in a Hamilton Beach blender for 10 minutes. Polymers were then slowly added for 10 minutes. The resulting wellbore samples were stabilized at 300° F. (149° C.) for 16 h by hot rolling. They were then static heat aged at 300° F. for another 3 to 7 days.

Wellbore fluids samples were cooled at room temperature after aging, and mixed for 5 minutes in a Hamilton beach blender. Their rheology was measured at 120° F. and High Pressure High Temperature Fluid Loss (HPHT) were measured at 300° F. with 500 psi (pound per square inch, 15 psi=1 atm) differential pressure.

TABLE 2

Wellbore fluid sample formulations

Wellbore fluids formulations (quantities in g)

| Sample | F1 (g) | F2 (g) | F3 (g) | F4 (g) | F5 (g) |
|---|---|---|---|---|---|
| Water | 237,5 | 237,5 | 237,5 | 237,5 | 237,5 |
| $CaCl_2$ | 105 | 105 | 105 | 105 | 105 |
| Defoamer | 0,5 | 0,5 | 0,5 | 0,5 | 0,5 |
| Polymer A | 7 |  |  |  |  |
| Polymer B |  | 7 |  |  |  |
| Polymer C |  |  | 7 |  |  |
| Polymer D |  |  |  | 7 |  |
| Polymer E |  |  |  |  | 7 |

The results obtained are as follow (Table 3, 4 and 5):

TABLE 3

Rheology values after aging for formulations F1 & F2 (Polymers A and B obtained by polymerization by precipitation and branched with TAAC)

| Rheology at 120° F. (lb/100 ft$^2$) | Before cond. at 300° F. Polymer A | Before cond. at 300° F. Polymer B | After hot rolling at 300° F. Polymer A | After hot rolling at 300° F. Polymer B | After static aging at 300° F. for 3 days Polymer A | After static aging at 300° F. for 3 days Polymer B | After static aging at 300° F. for 7 days Polymer A | After static aging at 300° F. for 7 days Polymer B |
|---|---|---|---|---|---|---|---|---|
| 600, lb/100 ft$^2$ | 90 | 87 | 80 | 79 | 78 | 78 | 75 | 75 |
| 300, lb/100 ft$^2$ | 63 | 61 | 55 | 55 | 54 | 55 | 52 | 51 |
| 200, lb/100 ft$^2$ | 50 | 49 | 45 | 45 | 44 | 44 | 42 | 41 |
| 100, lb/100 ft$^2$ | 35 | 34 | 32 | 32 | 31 | 30 | 30 | 30 |
| 6, lb/100 ft$^2$ | 11 | 11 | 10 | 10 | 10 | 10 | 9 | 9 |
| 3, lb/100 ft$^2$ | 9 | 9 | 8 | 8 | 8 | 9 | 7 | 7 |
| 10 sec gel, lb/100 ft$^2$ | 10 | 10 | 9 | 9 | 9 | 9 | 8 | 8 |
| 10 min gel, lb/100 ft$^2$ | 10 | 10 | 10 | 10 | 10 | 10 | 9 | 9 |
| PV*, cP | 27 | 26 | 25 | 24 | 24 | 23 | 23 | 24 |
| YP*, lb/100 ft$^2$ | 36 | 35 | 30 | 31 | 30 | 32 | 29 | 27 |
| Top brine separation (%) | — | — | — | — | — | — | — | — |
| HTHP, 30 min (mL) | 17 | 17 | 18 | 18 | 18 | 18.5 | 18 | 18 |
| Cake thickness (mm) | 0.5 | 0.5 | 0.5 | 0.5 | 0.5 | 0.5 | 0.5 | 0.5 |

*"PV" is plastic viscosity which is one variable used in the calculation of viscosity characteristics of a drilling fluid, measured in centipoise (cp) units.
"YP" is yield point which is another variable used in the calculation of viscosity characteristics of drilling fluids measured in pounds per 100 feet square (lb/100 ft$^2$; 1 lb = 454 g; 1 ft = 30.48 cm).
"AV" is apparent viscosity which is another variable used in the calculation of viscosity characteristic of drilling fluid, measured in centipoise (cp) units.
"GEL" is a measure of the suspending characteristics, or the thixotripic properties of a drilling fluid, measured in pounds per 100 square feet (lb/100 ft$^2$).
"API F.L." is the term used for API filtrate loss in milliliters (mL).
"HTHP" is the term used for high temperature high pressure fluid loss, measured in milliliters (mL) according to API bulletin RP 13 B-2, 1990.

TABLE 4

Rheology values after aging for formulations F3 & F4 (Polymers C and D obtained by polymerization by precipitation and branched with TAADMS & MBA)

| Rheology at 120° F. | Before cond. at 300° F. Polymer C | Before cond. at 300° F. Polymer D | After hot rolling at 300° F. Polymer C | After hot rolling at 300° F. Polymer D | After static aging at 300° F. for 3 days Polymer C | After static aging at 300° F. for 3 days Polymer D | After static aging at 300° F. for 7 days Polymer C | After static aging at 300° F. for 7 days Polymer D |
|---|---|---|---|---|---|---|---|---|
| 600, lb/100 ft$^2$ | 77 | 58 | 86 | 50 | 78 | 16 | 45 | 5 |
| 300, lb/100 ft$^2$ | 53 | 35 | 57 | 30 | 54 | 9 | 30 | 3 |
| 200, lb/100 ft$^2$ | 42 | 27 | 46 | 23 | 42 | 6 | 24 | 2 |
| 100, lb/100 ft$^2$ | 29 | 19 | 32 | 13 | 28 | 3 | 15 | 1 |
| 6, lb/100 ft$^2$ | 8 | 5 | 9 | 3 | 7 | 1 | 5 | 0 |
| 3, lb/100 ft$^2$ | 7 | 4 | 7 | 1 | 6 | 1 | 4 | 0 |
| 10 sec gel, lb/100 ft$^2$ | 7 | 5 | 8 | 2 | 7 | 1 | 4 | — |
| 10 min gel, lb/100 ft$^2$ | 8 | 5 | 8 | 2 | 7 | 1 | 5 | — |
| PV, cP | 24 | 23 | 29 | 20 | 24 | 7 | 15 | 2 |
| YP, lb/100 ft$^2$ | 29 | 8 | 28 | 7 | 30 | 3 | 15 | 1 |
| Top brine separation (%) | — | — | — | — | — | 25% | <15% | >25% |
| HTHP fluid loss, 30 min (mL) | 20 | 32 | 20 | 34 | 22 | >50 | 42 | >50 |
| Cake thickness (mm) | 0.5 | 1.5 | 0.5 | 2 | 0.5 | NA | 3 | NA |

TABLE 5

Rheology values after aging for formulations F1 & F5 (Polymers A and E, branched with TAAC but obtained by different polymerization methods)

| Rheology at 120° F. | Before cond. at 300° F. | | After hot rolling at 300° F. | | After static aging at 300° F. for 3 days | | After static aging at 300° F. for 7 days | |
|---|---|---|---|---|---|---|---|---|
| | Polymer A | Polymer E | Polymer A | Polymer E | Polymer A | Polymer E | Polymer A | Polymer E |
| 600, lb/100 ft$^2$ | 90 | 102 | 80 | 51 | 78 | 19 | 75 | 4 |
| 300, lb/100 ft$^2$ | 63 | 72 | 55 | 30 | 54 | 10 | 52 | 2 |
| 200, lb/100 ft$^2$ | 50 | 57 | 45 | 22 | 44 | 6 | 42 | 1 |
| 100, lb/100 ft$^2$ | 35 | 30 | 32 | 12 | 31 | 3 | 30 | 0 |
| 6, lb/100 ft$^2$ | 11 | 13 | 10 | 2 | 10 | 1 | 9 | 0 |
| 3, lb/100 ft$^2$ | 9 | 11 | 8 | 1 | 8 | 1 | 7 | 0 |
| 10 sec gel, lb/100 ft$^2$ | 10 | 10 | 9 | 2 | 9 | 1 | 8 | — |
| 10 min gel, lb/100 ft$^2$ | 10 | 11 | 10 | 2 | 10 | 1 | 9 | — |
| PV, cP | 27 | 30 | 25 | 21 | 24 | 9 | 23 | 2 |
| YP, lb/100 ft$^2$ | 36 | 42 | 30 | 9 | 30 | 1 | 29 | 1 |
| Top brine separation (%) | — | — | — | 10% | — | 25% | — | >25% |
| HTHP fluid loss, 30 min (mL) | 17 | 32 | 18 | 41 | 18 | >50 | 18 | >50 |
| Cake thickness (mm) | 0.5 | 1.5 | 0.5 | 3 | 0.5 | NA | 0.5 | NA |

Example 3

Test in CaBr$_2$ Brine Solution

The same protocol as example 2 was applied for polymers A to E for the preparation of wellbore fluid samples and evaluation of the rheology of these polymers before and after aging by using CaBr$_2$ brine having a density of 14.2 ppg.

The results are summarized in Tables 6, 7, 8, and 9.

TABLE 6

Wellbore fluid sample formulations

Wellbore fluids formulations (quantities in g)

| Sample | F6 | F7 | F8 | F9 | F10 |
|---|---|---|---|---|---|
| Water | 183,6 | 183,6 | 183,6 | 183,6 | 183,6 |
| CaCl$_2$ | 158,9 | 158,9 | 158,9 | 158,9 | 158,9 |
| Defoamer | 0,5 | 0,5 | 0,5 | 0,5 | 0,5 |
| Polymer A | 7 | | | | |
| Polymer B | | 7 | | | |
| Polymer C | | | 7 | | |
| Polymer D | | | | 7 | |
| Polymer E | | | | | 7 |

TABLE 7

Rheology values after aging for formulations F6 & F7 (Polymers A and B obtained by polymerization by precipitation and branched with TAAC)

| Rheology at 120° F. | Before cond. at 300° F. | | After hot rolling at 300° F. | | After static aging at 300° F. for 3 days | | After static aging at 300° F. for 7 days | |
|---|---|---|---|---|---|---|---|---|
| | Polymer A | Polymer B | Polymer A | Polymer B | Polymer A | Polymer B | Polymer A | Polymer B |
| 600, lb/100 ft$^2$ | 80 | 78 | 100 | 95 | 90 | 89 | 87 | 87 |
| 300, lb/100 ft$^2$ | 54 | 52 | 66 | 61 | 60 | 61 | 56 | 56 |
| 200, lb/100 ft$^2$ | 21 | 20 | 52 | 48 | 41 | 40 | 38 | 38 |
| 100, lb/100 ft$^2$ | 15 | 15 | 35 | 33 | 27 | 27 | 24 | 23 |
| 6, lb/100 ft$^2$ | 7 | 7 | 10 | 9 | 9 | 9 | 8 | 7 |
| 3, lb/100 ft$^2$ | 5 | 5 | 8 | 8 | 7 | 7 | 6 | 6 |
| 10 sec gel, lb/100 ft$^2$ | 6 | 6 | 9 | 8 | 8 | 8 | 7 | 7 |
| 10 min gel, lb/100 ft$^2$ | 6 | 6 | 9 | 9 | 9 | 9 | 8 | 8 |

TABLE 7-continued

Rheology values after aging for formulations F6 & F7 (Polymers A and B obtained by polymerization by precipitation and branched with TAAC)

| Rheology at 120° F. | Before cond. at 300° F. | | After hot rolling at 300° F. | | After static aging at 300° F. for 3 days | | After static aging at 300° F. for 7 days | |
|---|---|---|---|---|---|---|---|---|
| | Polymer A | Polymer B | Polymer A | Polymer B | Polymer A | Polymer B | Polymer A | Polymer B |
| PV, cP | 26 | 26 | 34 | 34 | 30 | 28 | 31 | 31 |
| YP, lb/100 ft$^2$ | 28 | 26 | 32 | 37 | 30 | 33 | 25 | 25 |
| Top brine separation (%) | — | — | — | — | — | — | — | — |
| HTHP fluid loss, 30 min (mL) | 21 | 21.5 | 21 | 21.5 | 21 | 21 | 21 | 21.5 |
| Cake thickness (mm) | 0.5 | 0.5 | 0.5 | 0.5 | 0.5 | 0.5 | 0.5 | 0.5 |

TABLE 8

Rheology values after aging for formulations F8 & F9 (Polymers C and D obtained by polymerization by precipitation and branched with TAADMS & MBA)

| Rheology at 120° F. | Before cond. at 300° F. | | After hot rolling at 300° F. | | After static aging at 300° F. for 3 days | | After static aging at 300° F. for 7 days | |
|---|---|---|---|---|---|---|---|---|
| | Polymer C | Polymer D | Polymer C | Polymer D | Polymer C | Polymer D | Polymer C | Polymer D |
| 600, lb/100 ft$^2$ | 80 | 56 | 100 | 28 | 90 | 15 | 87 | NA |
| 300, lb/100 ft$^2$ | 54 | 34 | 66 | 15 | 60 | 10 | 56 | NA |
| 200, lb/100 ft$^2$ | 21 | 27 | 52 | 10 | 41 | 7 | 38 | NA |
| 100, lb/100 ft$^2$ | 15 | 17 | 35 | 6 | 27 | 4 | 24 | NA |
| 6, lb/100 ft$^2$ | 7 | 6 | 10 | 2 | 9 | 1 | 8 | NA |
| 3, lb/100 ft$^2$ | 5 | 4 | 8 | 1 | 7 | 1 | 6 | NA |
| 10 sec gel, lb/100 ft$^2$ | 6 | 5 | 9 | 1 | 8 | — | 7 | NA |
| 10 min gel, lb/100 ft$^2$ | 6 | 5 | 9 | 1 | 9 | — | 8 | NA |
| PV, cP | 26 | 22 | 34 | 13 | 30 | 5 | 31 | NA |
| YP, lb/100 ft$^2$ | 28 | 12 | 32 | 2 | 30 | 5 | 25 | NA |
| Top brine separation (%) | — | — | — | 15% | — | 25% | — | NA |
| HTHP fluid loss, 30 min (mL) | 21 | 34 | 21 | >50 | 21 | >50 | 21 | NA |
| Cake thickness (mm) | 0.5 | 3 | 0.5 | NA | 0.5 | NA | 0.5 | NA |

TABLE 9

Rheology values after aging for formulations F6 & F10 (Polymers A and E, branched with TAAC but obtained by different polymerization methods)

| Rheology at 120° F. | Before cond. at 300° F. | | After hot rolling at 300° F. | | After static aging at 300° F. for 3 days | | After static aging at 300° F. for 7 days | |
|---|---|---|---|---|---|---|---|---|
| | Polymer A | Polymer E | Polymer A | Polymer E | Polymer A | Polymer E | Polymer A | Polymer E |
| 600, lb/100 ft$^2$ | 80 | 90 | 100 | 102 | 90 | 10 | 87 | NA |
| 300, lb/100 ft$^2$ | 54 | 62 | 66 | 67 | 60 | 7 | 56 | NA |
| 200, lb/100 ft$^2$ | 21 | 27 | 52 | 52 | 41 | 3 | 38 | NA |
| 100, lb/100 ft$^2$ | 15 | 18 | 35 | 35 | 27 | 2 | 24 | NA |
| 6, lb/100 ft$^2$ | 7 | 9 | 10 | 10 | 9 | 1 | 8 | NA |
| 3, lb/100 ft$^2$ | 5 | 7 | 8 | 8 | 7 | 1 | 6 | NA |
| 10 sec gel, lb/100 ft$^2$ | 6 | 6 | 9 | 9 | 8 | — | 7 | NA |
| 10 min gel, lb/100 ft$^2$ | 6 | 6 | 9 | 9 | 9 | — | 8 | NA |
| PV, cP | 26 | 28 | 34 | 35 | 30 | 3 | 31 | NA |
| YP, lb/100 ft$^2$ | 28 | 34 | 32 | 32 | 30 | 4 | 25 | NA |

TABLE 9-continued

Rheology values after aging for formulations F6 & F10 (Polymers A and E, branched with TAAC but obtained by different polymerization methods)

| Rheology at 120° F. | Before cond. at 300° F. | | After hot rolling at 300° F. | | After static aging at 300° F. for 3 days | | After static aging at 300° F. for 7 days | |
|---|---|---|---|---|---|---|---|---|
| | Polymer A | Polymer E | Polymer A | Polymer E | Polymer A | Polymer E | Polymer A | Polymer E |
| Top brine separation (%) | — | — | — | 20% | — | >25% | — | NA |
| HTHP fluid loss, 30 min (mL) | 21 | 35 | 21 | >50 | 21 | >50 | 21 | NA |
| Cake thickness (mm) | 0.5 | 3 | 0.5 | NA | 0.5 | NA | 0.5 | NA |

For examples 2 and 3, polymers A and B, which are obtained by polymerization by precipitation and branched with TAAC, rheology properties are stable after aging at high temperature, which is not the case for all other polymers (C to E) that show unstable rheological properties.

The invention claimed is:

1. A water-soluble branched sulfonated amphoteric polymer, for a water-based drilling fluid, wherein the polymer is obtained by precipitation polymerization, in a mixture of polar solvents, of at least one N,N'-dialkylacrylamide monomer and one sulfonic acid-containing monomer, in the presence of tetraallylammonium halide as branching agent, wherein said water-soluble branched sulfonated amphoteric polymer has a Huggins coefficient that is stable after 7 days at 300° F., as determined by a variation in the Huggins coefficient of less than 10%.

2. The water-soluble branched sulfonated amphoteric polymer of claim 1, wherein the tetraallylammonium halide is tetraallylammonium chloride.

3. The water-soluble branched sulfonated amphoteric polymer of claim 1, wherein the water-soluble branched sulfonated polymer comprises between 0.1 and 5.0 weight percent of tetraallylammonium halide based on the total weight of its monomers.

4. The water-soluble branched sulfonated amphoteric polymer of claim 1, wherein the water-soluble branched sulfonated polymer comprises between 0.1 and 5.0 weight percent of tetraallylammonium chloride based on the total weight of its monomers.

5. The water-soluble branched sulfonated amphoteric polymer of claim 1, wherein the sulfonic acid-containing monomer is selected from the group consisting of 2-acrylamido-2-methyl propane-sulfonic acid, 2-methacrylamido-2-methylpropane-sulfonic acid, sulfonated styrene, and allyl ether sulfonic acids and their corresponding salts.

6. The water-soluble branched sulfonated amphoteric polymer of claim 1, wherein the water-soluble branched sulfonated amphoteric polymer contains between 50 and 99.9 mole percent of sulfonic acid-containing monomer based on the total number of moles of its monomers.

7. The water-soluble branched sulfonated amphoteric polymer of claim 1, wherein the sulfonic acid-containing monomer is sodium 2-acrylamido-2-methylpropane-sulfonate.

8. The water-soluble branched sulfonated amphoteric polymer of claim 1, wherein the N,N'-dialkylacrylamide is selected from N,N'-dialkylacrylamide having $C_1$ to $C_{14}$ alkyl groups.

9. The water-soluble branched sulfonated amphoteric polymer of claim 1, wherein the N,N'-dialkylacrylamide is N,N'-dimethylacrylamide or acryloyl morpholine.

10. The water-soluble branched sulfonated amphoteric polymer of claim 1, wherein the mixture of polar solvents is a mixture of 2-methyl-2-propanol/water having a weight ratio between 90/10 and 99/1.

11. A water-based drilling fluid for subterranean boreholes, comprising:
an aqueous fluid selected from sea water, brine, or salt-containing aqueous solution,
between 0.1 and 5.0 weight percent of the water-soluble branched sulfonated amphoteric polymer of claim 1.

12. The water-based drilling fluid of claim 11, wherein the water-soluble branched sulfonated amphoteric polymer contains between 50 and 99.9 mole percent of sodium 2-acrylamido-2-methylpropane-sulfonate, between 0.1 and 50 mole percent of N,N-dimethylacrylamide and between 0.1 and 5 weight percent of tetraallyl ammonium halide.

13. The water-based drilling fluid of claim 11, wherein the water-soluble branched sulfonated amphoteric polymer contains between 50 and 99.9 mole percent of sodium 2-acrylamido-2-methylpropane-sulfonate, between 0.1 and 50 mole percent of acryloyl morpholine and between 0.1 and 5 weight percent of tetraallyl ammonium halide.

14. The water-based drilling fluid of claim 11, wherein the water-soluble branched sulfonated amphoteric polymer contains between 50 and 99.9 mole percent of sodium 2-acrylamido-2-methylpropane-sulfonate, between 0.1 and 50 mole percent of N,N-dimethylacrylamide and between 0.1 and 5 weight percent of tetraallyl ammonium chloride.

15. The water-based drilling fluid of claim 11, wherein the water-soluble branched sulfonated amphoteric polymer contains between 50 and 99.9 mole percent of sodium 2-acrylamido-2-methylpropane-sulfonate, between 0.1 and 50 mole percent of acryloyl morpholine and between 0.1 and 5 weight percent of tetraallyl ammonium chloride.

* * * * *